UNITED STATES PATENT OFFICE.

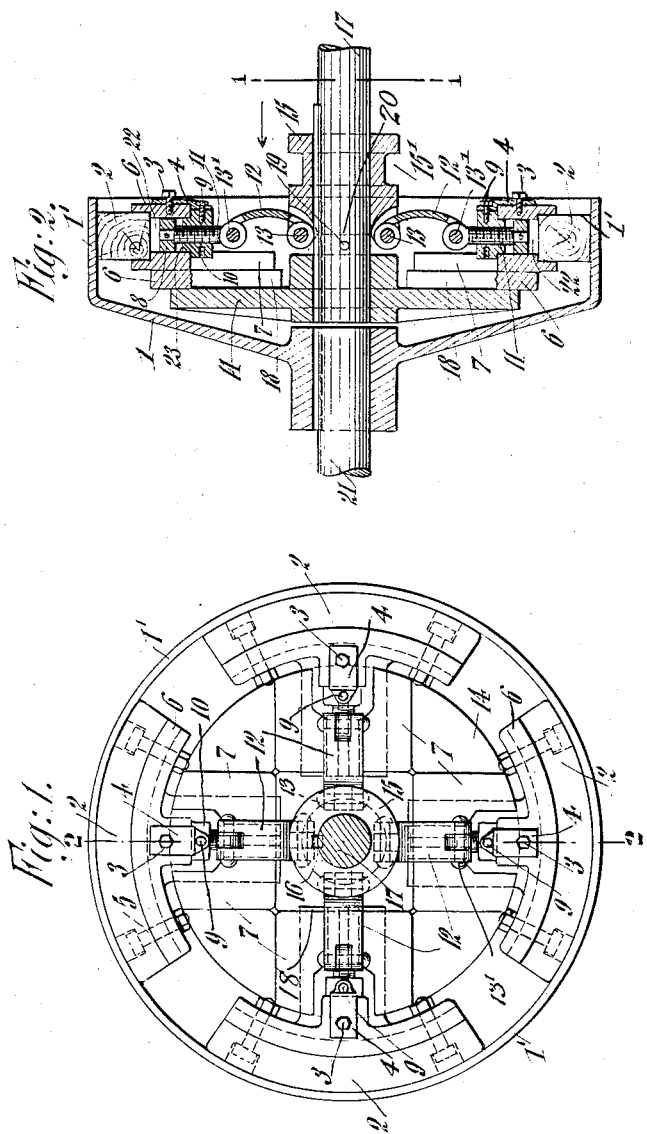

LUDWIG WOLFFGRAM, OF ERIE, PENNSYLVANIA.

CLUTCH.

1,304,138. Specification of Letters Patent. Patented May 20, 1919.

Application filed October 11, 1917. Serial No. 195,895.

*To all whom it may concern:*

Be it known that I, LUDWIG WOLFFGRAM, a citizen of the German Empire, and resident of Erie, county of Erie, and State of Pennsylvania, have invented certain new and useful Improvements in Clutches, of which the following is a specification.

My invention relates to friction couplings or clutches for transmitting power from one rotary member to another, and is generally used for driving one shaft from another. The object of this invention is to provide a friction coupling of simple construction, the parts of which are readily accessible, and the operation of which will be reliable, the parts remaining in the coupled position until they are positively uncoupled, whereby accidental disengagement of the coupled parts is prevented.

In the accompanying drawings—

Figure 1 is a face view of a shaft coupling embodying my invention, the driven shaft being shown in section of line 1—1 of Fig. 2; and Fig. 2 is a section on line 2—2 of Fig. 1.

It will be understood that the drawing illustrates an example and preferred embodiment of my invention, but various modifications may be made without departing from the nature of the invention, as set forth in the appended claims.

The conical body or housing 1, which is keyed or otherwise rigidly secured to the drive shaft 21, is adapted to be engaged at the inner surface of its cylindrical flange portion 1′, by friction members or blocks 2 made of wood or other suitable material, said blocks being of segmental shape and secured, as by bolts and nuts 5, to segmental carriers 6 having suitable sockets to receive the blocks 2. These carriers 6, of which I have shown four, although that number may be varied, are provided with inward extensions 18 slidable along radial guides 7, which are formed on a disk 14 secured to the driven shaft 17 rigidly, for instance, by means of a key 16. On this driven shaft is adapted to slide lengthwise, yet held to rotate therewith, a clutch controlling sleeve 15 provided with an annular groove 15′ to be engaged by the operating end of a suitable shifting member, which may be of well known character and has therefore not been shown in the drawing. At the end nearest the drive shaft 21, the sleeve 15 is provided with recesses for receiving the inner ends of springs 12 connected pivotally with said sleeve by means of pins 13 extending transversely and tangentially, preferably within the same plane of rotation. The outer ends of these springs 12, which are shown as flat springs arched away from the disk 14, are connected pivotally, as by pins 13′ parallel to the corresponding pins 13, with screw-threaded bolts 11 extending into chambers 22 of the carriers 6 and provided with heads 8 movable radially in said chambers for adjustment. This adjustment, which alters the tension of the springs 12 as desired, is obtained by turning nuts 10 screwing upon said radial bolts 11 and normally held against radial or circumferential movement, by means of set screws 9 engaging suitable openings in the nuts and also extending through holes in brackets 4 secured rigidly to the carriers 6 by means of screws 3. The nuts 10 are provided at their outer faces with projections 23 extending into the inner ends of the chambers 22 and serving to properly center these nuts and the bolts 11. It will be noted that each spring 12, between its inner pivotal connection 13, and its outer pivotal connection 13′, forms a single arch the concavity of which faces the disk 14, that is to say, at each of its pivotal connections, said spring is curved or bent away from said disk.

The drawings illustrate the clutch in an intermediate position which it takes for an instant while passing from the uncoupled to the coupled condition or the reverse. When it is desired to couple the two shafts, the sleeve 15 is moved toward the shaft 21 as indicated by the arrow in Fig. 2, and this causes the blocks 2 to be moved outwardly into firm engagement with the flange 1′, thus coupling the shafts 21 and 17. It will be noticed that in the intermediate position illustrated, the pivot connections 13 and 13′ at the inner and outer ends of the springs 12 lie in the same plane of rotation, and a maximum of pressure is exerted by the springs. When the sleeve 15 is moved farther inward until its inner edge 20 engages a stop pin 19 rigid with the shaft 15, (this being the normal coupled position of the parts) the inner connections 13 are moved out of the transverse plane of rotation containing the outer connections 13′, and the result is that the springs are somewhat relaxed, but still have sufficient tension to keep the blocks 2 in coupling engagement with the flange or rim 1′.

Since the tension of the springs is increased when the sleeve 15 passes from the normal coupling position to the intermediate position illustrated, it follows that the springs tend to keep the clutch in the normal applied position so that an accidental disengagement of the clutch is prevented. When it is desired to uncouple the two shafts, it is necessary to apply power to positively withdraw the sleeve 15 from its inner position past the intermediate position shown, in the direction opposite to that indicated by the arrow in Fig. 2.

The set screws 9 normally not only hold the nuts 10 both against turning and against longitudinal movement, but also prevent longitudinal movement of the radial bolts 11 and of their heads 8 in the chambers 22. The projections 23 of the nuts 10 are thus kept within the inner ends of the respective chambers 22 as long as the nuts 10 are locked by their set screws 9. It will be understood that these screws 9 are removed or at least loosened whenever it is desired to turn the nuts 10 to adjust the outer pivot connections 13' toward or from the shaft for the purpose of increasing or decreasing the tension of the springs 12.

I claim:

1. As means for coupling two members mounted to turn about the same axis, a rim held to turn with one of said members, a body held to turn with the other member and provided with radial guides, carriers mounted to slide along said guides and provided with coupling blocks movable into and out of engagement with said rim, a shifting slide movable lengthwise of said second member and held to turn therewith, each of said carriers having a radial guide, a screw-threaded bolt movable along the last-named guide, and provided with a transverse pivot, said slide being provided with corresponding pivots parallel to the adjacent pivots on the bolts, springs connecting corresponding pivots, nuts on said bolts, and means for locking said nuts.

2. As a means for coupling two members mounted to turn about the same axis, a rim held to turn with one of said members, clutch means held to turn with the other member and movable into and out of engagement with said rim, a shifting slide movable lengthwise of said second member and held to turn therewith, and springs each of which has an inner pivotal connection with said slide and a parallel outer pivotal connection with said clutch means, each spring being arched and curving from each of its pivotal connections lengthwise of the axis of rotation in the direction in which the slide is moved to bring the clutch means to the released position.

3. As a means for coupling two members mounted to turn about the same axis, a rim held to turn with one of said members, a disk held to turn with the other member, clutch means held to turn with said disk but movable relatively thereto into and out of engagement with said rim, a shifting slide movable lengthwise of said second member toward and from said disk and held to turn therewith, and springs each of which has an inner pivotal connection with said slide and an outer pivotal connection with said clutch means, each spring, at each of its pivotal connections, being curved away from said disk and forming a single arch the concavity of which faces said disk.

In testimony, that I claim the foregoing as my invention, I have signed my name.

LUDWIG WOLFFGRAM.